United States Patent
Ai et al.

(10) Patent No.: US 7,669,941 B2
(45) Date of Patent: Mar. 2, 2010

(54) WHEEL END WITH LOAD SENSING CAPABILITIES

(75) Inventors: Xiaolan Ai, Massillon, OH (US); Graham F. McDearmon, North Canton, OH (US); Matthew Wilmer, North Canton, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 11/913,724

(22) PCT Filed: May 11, 2006

(86) PCT No.: PCT/US2006/018176

§ 371 (c)(1),
(2), (4) Date: Nov. 6, 2007

(87) PCT Pub. No.: WO2006/124485

PCT Pub. Date: Nov. 23, 2006

(65) Prior Publication Data

US 2008/0211293 A1    Sep. 4, 2008

Related U.S. Application Data

(60) Provisional application No. 60/680,103, filed on May 12, 2005.

(51) Int. Cl.
*G01N 3/00* (2006.01)
(52) U.S. Cl. .............................. 301/105.1; 73/862.042; 73/862.045; 73/862.322
(58) Field of Classification Search .............. 301/105.1; 73/146, 862.041, 862.042, 862.043, 862.044, 73/862.045, 862.322
See application file for complete search history.

(56) References Cited

U.S. PATENT DOCUMENTS 4,297,877 A * 11/1981 Stahl ........................... 73/146

(Continued)

FOREIGN PATENT DOCUMENTS

EP    1176324 A    1/2002

(Continued)

OTHER PUBLICATIONS

JP abstract vol. 2003 No. 12.

*Primary Examiner*—Russell D Stormer
(74) *Attorney, Agent, or Firm*—Polster, Lieder, Woodruff & Lucchesi, L.C.

(57) ABSTRACT

A wheel end (A) has a housing (2, 70, 80, 90) and a hub (4) provided with a spindle (32) that projects into the housing, and the hub rotates relative to the housing on an antifriction bearing (6) located between the housing and hub spindle. The housing has a tubular core (12, 72, 82, 92) that encloses the bearing and ring mounts (14, 74, 84, 94) spaced outwardly from the core and also webs (16, 76, 86, 96) that connect the ring mounts to the core. A road wheel (B) is attached to the hub and rotates with the hub relative to the housing. The housing is secured to a suspension upright (C) at its ring mounts. The core deflects relative to the ring mounts, owning to forces and moments transferred through the bearing from the suspension upright to the road wheel and vice versa, and the magnitude of those forces and moments are reflected in signals derived from strain sensor modules (SM) attached to the webs of the housing.

16 Claims, 5 Drawing Sheets

U.S. PATENT DOCUMENTS

| | | | |
|---|---|---|---|
| 4,748,844 A * | 6/1988 | Yoshikawa et al. | 73/146 |
| 5,894,094 A * | 4/1999 | Kuchler et al. | 73/862.044 |
| 6,269,702 B1 * | 8/2001 | Lambson | 73/862.045 |
| 6,324,919 B1 * | 12/2001 | Larsen et al. | 73/862.043 |
| 6,634,208 B2 * | 10/2003 | Salou et al. | 73/11.07 |
| 6,658,943 B2 * | 12/2003 | McDearmon | 73/795 |
| 6,701,780 B2 * | 3/2004 | Hofmann et al. | 73/146 |
| 7,178,413 B2 * | 2/2007 | Hofmann et al. | 73/862.541 |
| 7,240,570 B2 * | 7/2007 | McDearmon | 73/862.322 |
| 7,452,133 B2 * | 11/2008 | Ohtsuki et al. | 384/448 |

FOREIGN PATENT DOCUMENTS

| | | |
|---|---|---|
| EP | 1176409 | 1/2002 |
| GB | 2351950 | 1/2001 |
| JP | 2006119000 A | 5/2006 |
| WO | WO 01/77634 A | 10/2001 |

* cited by examiner

WHEEL END WITH LOAD SENSING CAPABILITIES

CROSS-REFERENCE TO RELATED APPLICATIONS

This application is the United States National Stage under 35 U.S.C. §371 of International Application No. PCT/US2006/018176 having an international filing date of May 11, 2006, and which derives and claims priority from U.S. provisional application 60/680,103 filed May 12, 2005, both of which are herein incorporated by reference in their entirety.

TECHNICAL FIELD

The present invention relates in general to wheel ends for automotive vehicles, and more particularly to a wheel end having a loading sensing capability.

BACKGROUND ART

Dynamic control systems for automotive vehicles operate the brakes and torque distribution systems on such vehicles so as to enhance driving comfort, vehicle stability and safety. These systems rely on wheel loads for control, but obtaining wheel loads accurately, reliably and at a reasonable cost has proven to be a challenging task for engineers. Great effort has been made over the years, and various means have been proposed. One example includes a magnetic sensor having a sensing component attached at the end of an arm, the other end of which is fixed to a suspension system component. The sensor monitor is a magnetic material molded into the sidewall of a tire. Another example is a wheel end with a non-rotating section and a rotating section. At least one sensor is attached to the non-rotating section to measure the distance between the non-rotating and rotating sections.

The above mentioned methods of load sensing in general are not very accurate or reliable and are susceptible to changes in environmental conditions. What is needed is an wheel bearing with improved load sensing capability.

SUMMARY OF THE INVENTION

The present invention resides in a wheel end having the capacity to monitor loads transmitted through it and to a process for monitoring such loads. The wheel end includes a housing and a hub provided with a spindle that rotates in the housing on a bearing. The housing includes a core and mounts spaced outwardly from the core as well as webs extended between the mounts and the core. Sensors attached to the webs provide signals that reflect strains in the web, and from those strains one can ascertain loads transmitted through the wheel end.

BEST MODES FOR CARRYING OUT THE INVENTION

Figure 1:
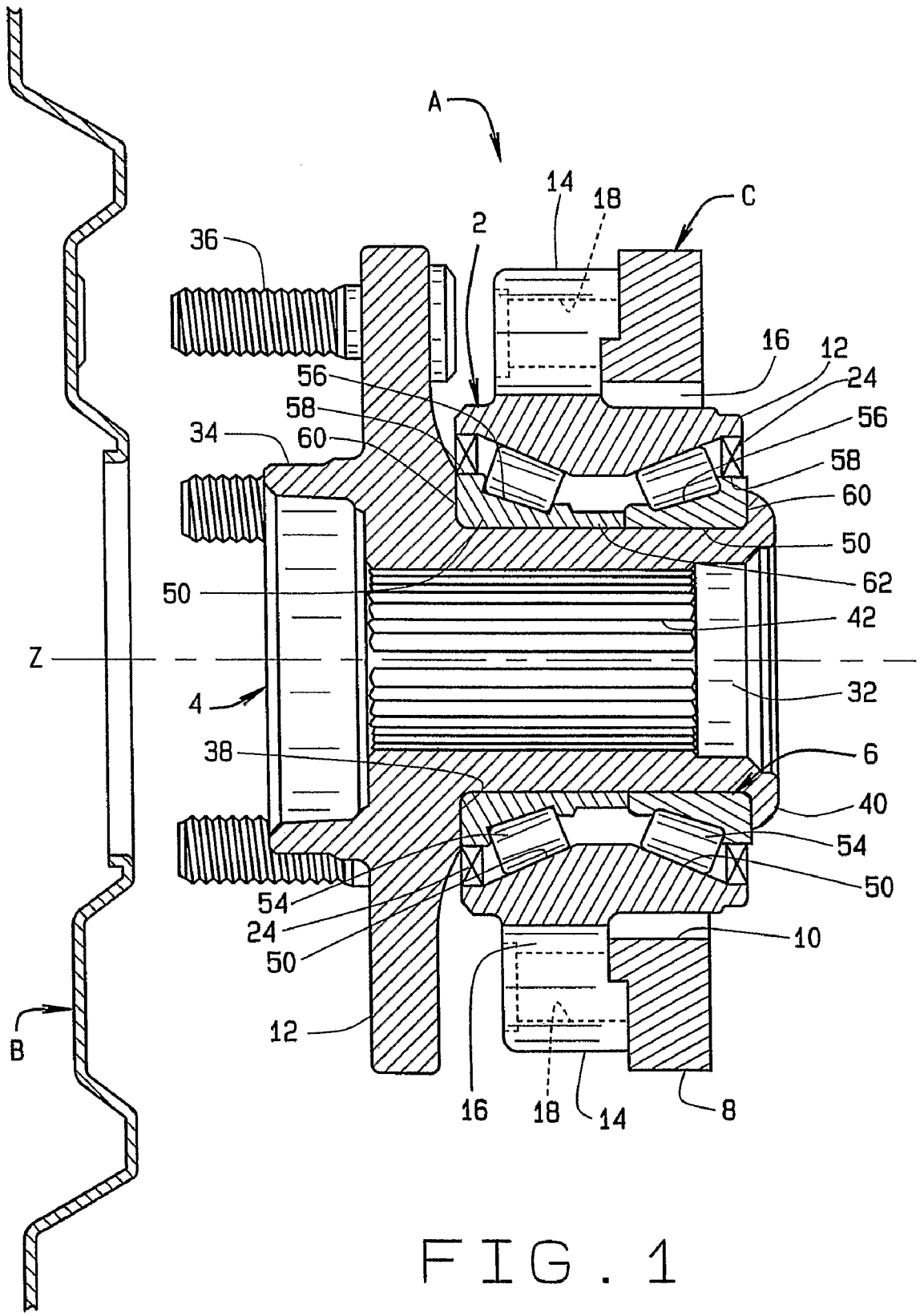
FIG. 1 is a longitudinal sectional view of a wheel end constructed in accordance with an embodying the present invention and fitted to a suspension system component.
Figure 2:
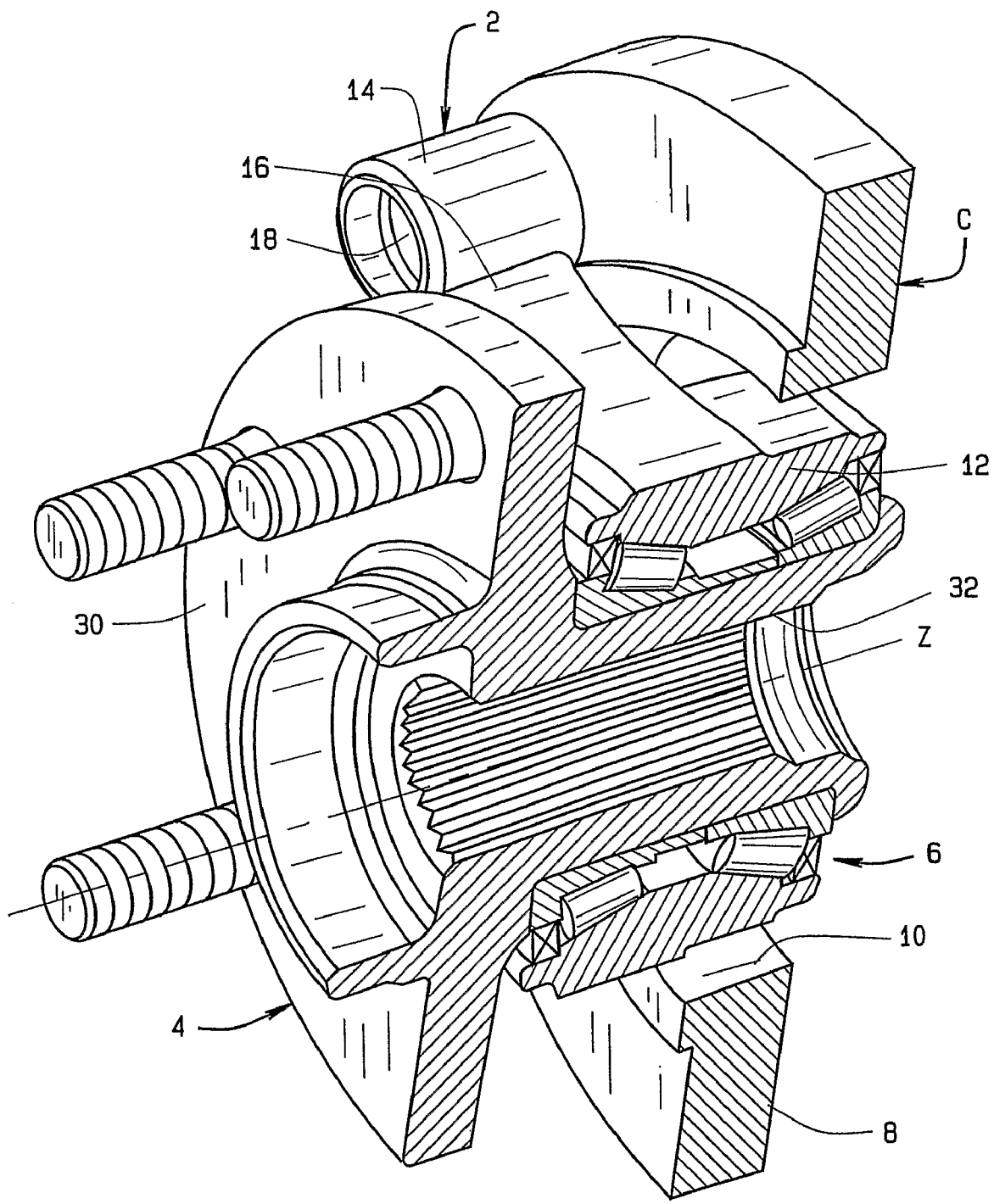
FIG. 2 is a perspective view, partially broken away and in section, of the wheel end fitted to a suspension system component.

Referring now to the drawings, a wheel end A (FIGS. 1 & 2) serves to couple a road wheel B for an automotive vehicle to a suspension system component C, such as a steering knuckle or other suspension upright, on the vehicle. The wheel end A enables the road wheel B to rotate about an axis Z with minimal friction and further produces electrical signals that reflect forces and moments acting on the wheel end A. Those signals, which are processed, provide the information required for the operation of braking and torque distribution systems on the vehicle—and thus facilitates dynamic control. The wheel end A includes a housing 2, a hub 4 that extends into the housing 2, and a bearing 6 located between the housing 2 and hub 4 to enable the hub 4 to rotate relative to the housing 2 about the axis Z. The suspension system component C includes a backing portion 8 containing an opening 10, preferably circular in shape. It may also have arms extended generally vertically from the backing portion 8.

Figure 4:
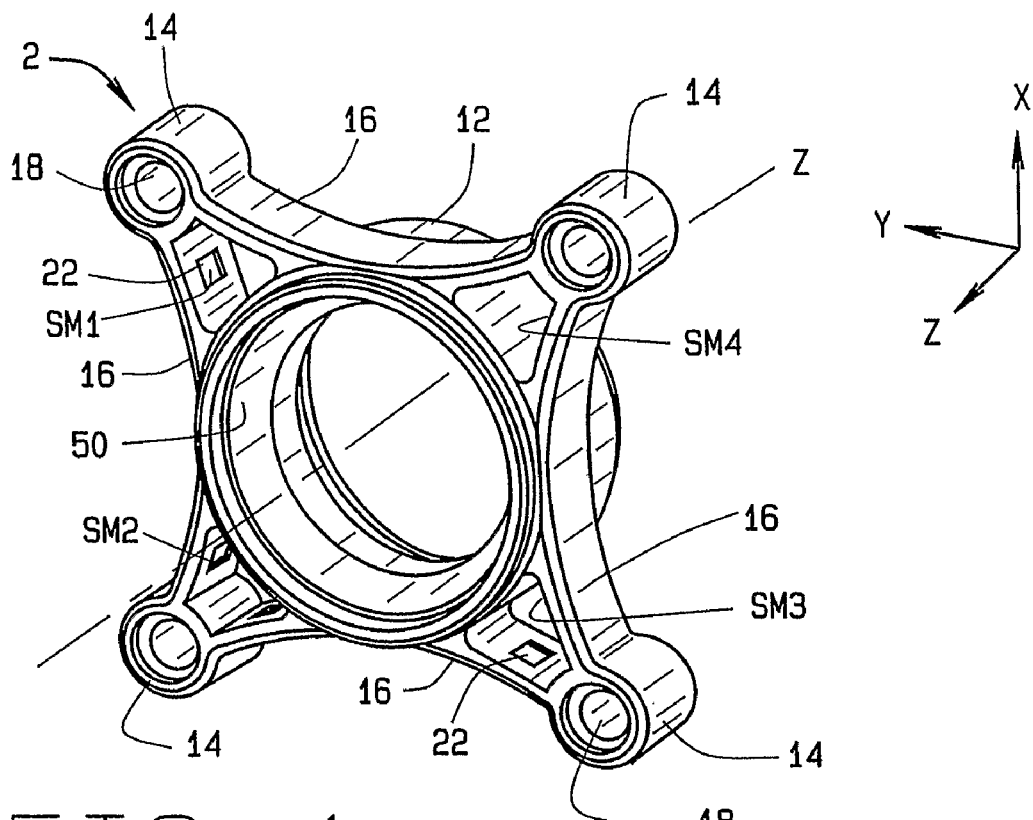
FIG. 4 is a perspective view from the outboard end of a housing forming part of the wheel end.

Turning now to the housing 2, it has (FIGS. 1 and 4) a cylindrical body or core 12 of tubular configuration and four ring mounts 14 that are located around the core 12 preferably at 90° intervals, with each offset 45° from the vertical. The ring mounts 14 are spaced outwardly from the core 12, yet are attached to the core 12 by webs 16, there being two webs 16 that converge from the core 12 to each ring mount 14. Each web 16 is wider than it is thick, its width being measured parallel to the axis Z. Yet neither the webs 16 nor the ring mounts 12 are as wide as the core 12, so the core 12 projects axially beyond the webs 16 and ring mounts 14, more so at the inboard end of the housing 12 than at the outboard end. Each ring mount 14 has a through bore 18 that lies parallel to the axis Z and receives a screw (not shown) that secures the housing 2 to the suspension system component C. At least one web 16 of each pair contains a pocket 22 that opens out of its inside face, that is the face that is presented toward the other web 16 of the pair. The pocket 22 contains a sensor module SM that is capable of detecting strains in the web 16. At its end the cylindrical core 12 is fitted with seals 24.

Figure 3:
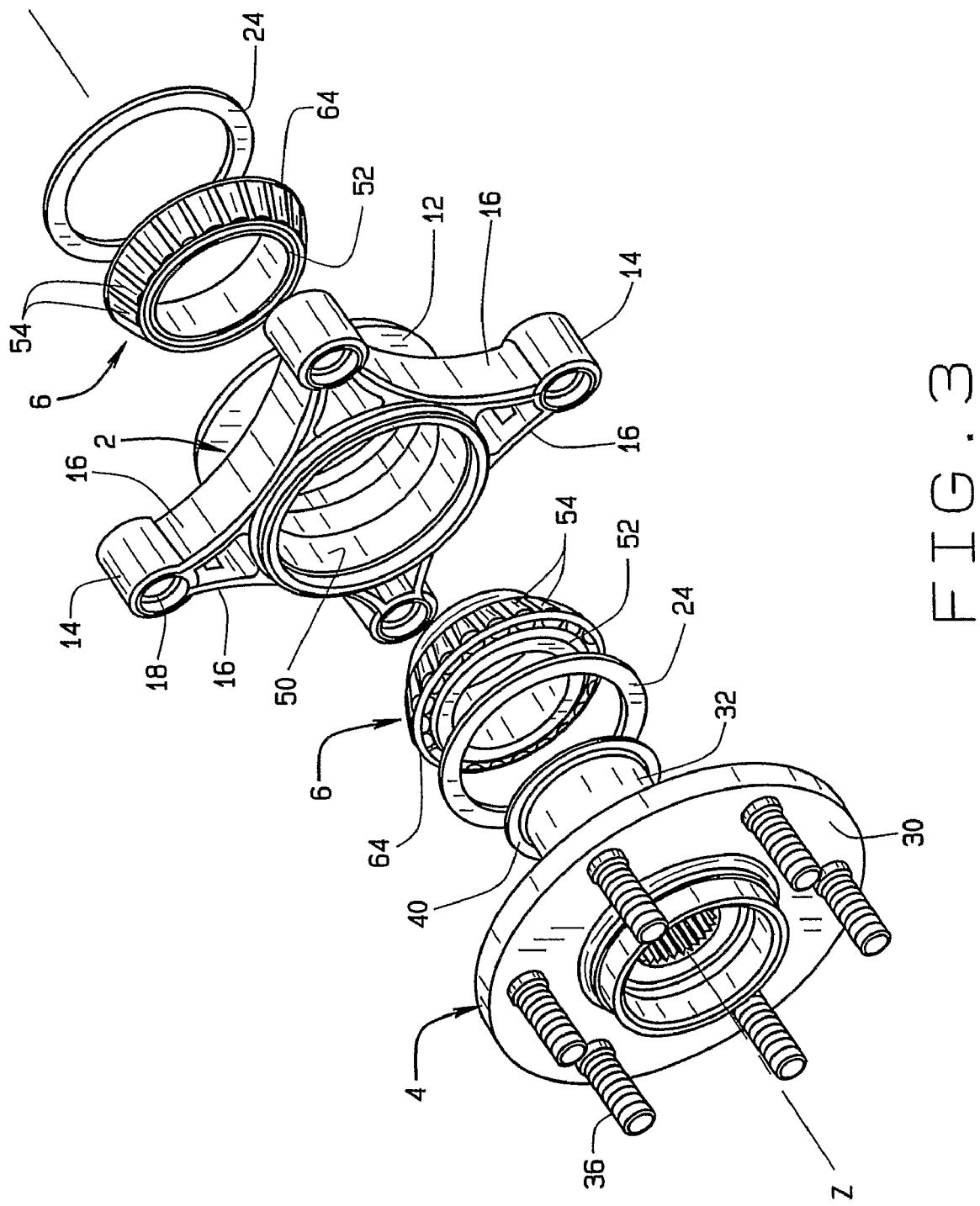
FIG. 3 is an exploded perspective view of the wheel end.

The hub 4 has (FIGS. 1 & 3) a drive flange 30 that lies beyond the outboard end of the cylindrical core 12, a spindle 32 that projects from the drive flange 30 into the cylindrical core 12 of the housing 2, and a wheel pilot 34 that projects from the drive flange 30 in the opposite direction. All three are united in integral casting or forging. The drive flange 30 is fitted with lug bolts 36 that project axially from it away from the housing 2 to secure the road wheel B to the hub 4 and a brake drum or disk as well. The spindle 32 emerges from the drive flange 30 at a shoulder 38 and at its opposite end, that is to say, at its inboard end, is turned outwardly in the provision of a formed end 40. The wheel pilot 34 serves to center the road wheel B on the drive flange 30. Within its interior the hub 4 may have a spline 42 for coupling the hub 4 with a drive shaft to thus transfer torque to the wheel B, although the wheel end A may also be used to couple a nondriven road wheel B to the suspension system component C.

The bearing 6 includes two outer raceways 50 located in the cylindrical core 12 of the housing 2, one being outboard and the other inboard, and two inner races in the form of cones 52 fitted over the spindle 32 of the hub 4. The outboard cone 52 lies within the outboard outer raceway 50, and the inboard cone 52 lies within the inboard outer raceway 50. In addition, the bearing 6 includes rolling elements in the form of tapered rollers 54 organized in the two rows, one around the outboard cone 52 and within the outboard outer raceway 50 and the other around the inboard cone 52 and within the inboard outer raceway 50. Actually, the bearing 6 may be considered two single row tapered roller bearings or a double row tapered roller bearing.

The two outer raceways 50 lie within the space between the seals 24 and taper downwardly toward each other so that they are closest at their small diameter ends. They are machined into the cylindrical core 12 of the housing 2, so that the core 12 is in effect an outer race for the bearing 6. However, the outer raceways 50 may be on separate cups or on a single double cup pressed into the core 12.

Each cone 52 has a tapered raceway 56 that is presented outwardly away from the axis Z and tapers in the same direction as outer raceway 50 within which it lies. At the large diameter end of its raceway 56 the cone 52 has a thrust rib 58 that leads out to a back face 60 that is squared off with respect to the axis Z. One of the cones 52 has an extension 62 extending in the opposite direction, that is away from the small diameter end of its raceway 56.

The tapered rollers 54 fit around the cones 52 and within the outer raceways 50, with their tapered side faces being against the raceways 50 and 56 and their large end faces against the thrust ribs 58. Initially, the cones 52 are separated from the spindle 32 of the hub 4, each with its row of rollers 54 retained about it by a cage 64 (FIG. 3) to form a cone assembly. Moreover, the formed end 40 initially exists as an axially directed extension of the spindle 32 no greater in diameter than the remainder of the spindle 32.

To assemble the wheel end A, the inboard cone 52 with its complement of rollers 54 (the inboard cone assembly) is pressed over the spindle 32 until its back face 60 abuts the shoulder 38 at the outboard end of the spindle 32. Then the housing 2 is fitted over the hub 4 such that the core 12 of the housing 2 receives the spindle 32 of the hub 4. Indeed, the housing 2 is advanced until the rollers 54 of the outboard row seat against the outboard outer raceway 50 and the outboard inner raceway 56 of the outboard cone 52. Thereupon, the inboard cone 52 with its complement of rollers 54 (the inboard cone assembly) is pressed over the spindle 32, leaving the extended end of the spindle 32 projecting beyond the back face 60 of the inboard cone 52. Next the extended end of the spindle 32 is upset in a roll-forming operation, it being deformed outwardly against the back face 60 of the inboard cone 52. The force produced from the roll forming drives the front ends of the two cones 52, which is at the cone extension 62 of the one cone 52, together. U.S. Pat. No. 6,443,622 and U.S. patent application Ser. No. 11/283,160, filed Nov. 18, 2005, disclose procedures for converting the extended end of the spindle 32 into the formed end 40 and are incorporated herein by reference. Actually, the inboard cone 52 may be an integral part of the spindle 32, in which event the inboard raceway 56 and thrust rib 58 are machined directly into the spindle 32.

The geometry of the bearing 6 is such that the tapered rollers 54 for each row are on apex, meaning that the envelopes in which the tapered side faces of the rollers 54 lie have their apices at a common point along the axis Z and likewise the envelopes for the raceways 50 and 56 that those rollers 54 contact have their apices at the same point. Moreover, the length of the extension 62 is such that the bearing 6 is preferably set to slight preload, that is to say, to a condition in which no radial clearances exist between the rollers 54 and the raceways 50 and 56 along which they roll.

The screws secure the wheel end A firmly to the suspension system component C. To this end, the housing 2 of the wheel end A at its ring mounts 14 and along its webs 16 fits against the outboard face of the backing portion 8 with the inboard portion of the core 12 received in the opening 10 of the backing portion 8. However, the opening 10 is larger than the core 12, so that the backing portion 8 does not confine the core 12. As a consequence, the core 12 can displace slightly in the opening 10 in any direction radially with respect to the axis Z.

In the operation of the wheel end A, the hub 4 rotates while the housing 2 remains fixed, at least in the sense that it does not rotate. Forces, both weight and inertial, transfer between the housing 2 and hub 4 through the bearing 6—indeed, through the rollers 54 of the bearing 6—and these forces are directed both radially and axially. Moments exerted by the hub 4 on the housing 2 likewise transfer through the rollers 54. The forces and moments cause the webs 16 on the housing 2 to flex, and the magnitudes of the flexure in the several webs 16 serve as measure of the forces and moments.

Superimposing a rectangular coordinate system of three dimensions on the housing 2 of the wheel end A, the webs 16 lie in the plane defined by the X and Y axes, with the X axis being vertical and the Y axis being horizontal. The axis Z of rotation for the bearing 6 coincides with and is the Z axis. The webs 16, owing to their configuration, deflect more in the X-Y plane, than in other directions, and this allows the core 12 to deflect radially with respect to the ring mounts 14, while retarding deflection in the axial direction Z.

The flexures cause strains in the webs 16 and the sensor modules SM detect and monitor in those strains. Indeed, the sensor modules SM produce signals that reflect the magnitude of displacements of the webs 16 to which they are attached. Each module SM may contain sensors that detect shear strain Sab, longitudinal strain Sa (along the length of the web 16), and transverse strain Sb (crosswise in the web 16). Actually, a sensor module SM may have a sensor for monitoring longitudinal strains Sa and another sensor for monitoring transverse strains Sb. The shear strains Sab may be calculated from the longitudinal strains Sa and transverse strains Sb. The modules SM preferably reside within the pockets 22 of the webs 16 that they monitor with their strain sensors or sensing elements bonded to the surface of the web 16 sufficiently to undergo the deflection experienced by the web 16 at the pocket 22. The modules SM should be covered in their pockets 22 by a plastic or a sealing compound to protect them from the often harsh environment of the debris and water to which the wheel end A on occasion may be subjected. Each sensor module SM, in lieu of having individual strain sensors for monitoring longitudinal strains Sa and transverse strains Sb, may be a micro electromechanical system (MEMS). The webs 16 need not have the pockets 22 in order for the sensor modules SM to function.

Signals from the sensors of all the modules SM are sent to a signal processor where signals are processed to determine wheel loads and other useful information. The process may include signal conditioning, comparison, and addition, subtraction and any mathematical treatment to enhance useful signals and reduce or eliminate noises resulting from environmental factor changes, such as temperature change.

The sensors of the several modules SM located along the webs 16 of the housing 2 may be used to determine forces acting on the housing 2 along the axes X, Y and Z of the three-dimensional coordinate system, as well as moments about the axes X and Y. For the wheel end A provided with the housing 2, the following relationships exist:

$$Fx = f1[(S1a-S1b+S4a-S4b)-(S2a-S2b+S3a-S3b)]$$

$$Fy = f2[(S1a-S1b+S2a-S2b)-(S3a-S3b+S4a-S4b)]$$

$$Fz = f3(S1ab+S2ab+S3ab+S4ab)$$

$$Mx = f4(S1ab+S2ab-S3ab-S4ab)$$

$$My = f5(S1ab+S4ab-S2ab-S3ab)$$

Where S1, S2, S3 and S4 represent the signals produced by the strain sensor modules SM1, SM2, SM3 and SM4, respectively, which signals may be in the form of electrical potentials.

Where the subscript a represents the longitudinal direction along the web 16 to which it applies, the subscript b represents the transverse (crosswise and parallel to the axis Z) direction, and the subscript ab indicates shear.

Where x, y and z represent coordinates of a three-axis coordinate system in which the x axis is vertical, the y axis is horizontal, and the z axis is horizontal and coincides with the axis z of the bearing 6.

F represents a force along the axis identified by its subscript.

M represents a moment about the axis identified by its subscript.

f with its subscript represents a simple function that can be nothing more than a conversion factor.

Figure 5:
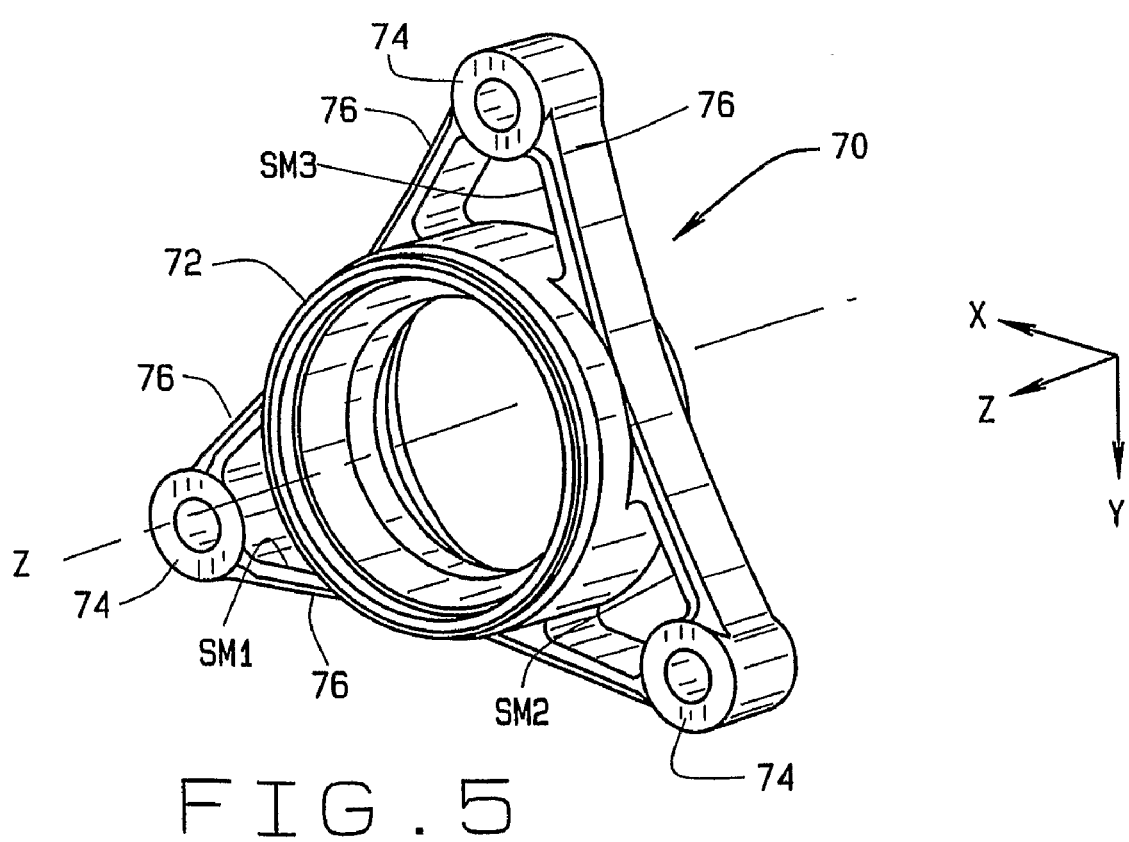
FIG. 5 is a perspective view from the inboard end of a modified housing for the wheel end.

A modified housing 70 (FIG. 5) is quite similar to the housing 2 in that it has cylindrical core 72 provided with tapered outer raceways 50 that form part of the bearing 6. However, the housing 70 has only three ring mounts 74 located around its preferably at 120° intervals, with one being at the very top or very bottom of the housing 70 along the vertical axis Y and the other two located 60° from the vertical axis Y. Each ring mount 74 is connected to the core 72 through a pair of webs 76 that converge from the core 72 to the ring mount 74. The core 72, ring mounts 74 and webs 76 are formed integral as a unitary casting or forging. One of the webs 76 connected to each ring mount 74 has a sensor module SM attached to it to measure strains in the web 76.

The following relationships exist within the wheel end A when provided with the housing 70:

$$Fx = f1[S1a-S1b-(S2a-S2b+S3a-S3b)]$$

$$Fy = f2[S2a-S2b-(S3a-S3b)]$$

$$Fz = f3(S1ab+S2ab+S3ab)$$

$$Mx = f4(S2ab-S3ab)$$

$$My = f5(S1ab-S2ab-S3ab)$$

Figure 6:
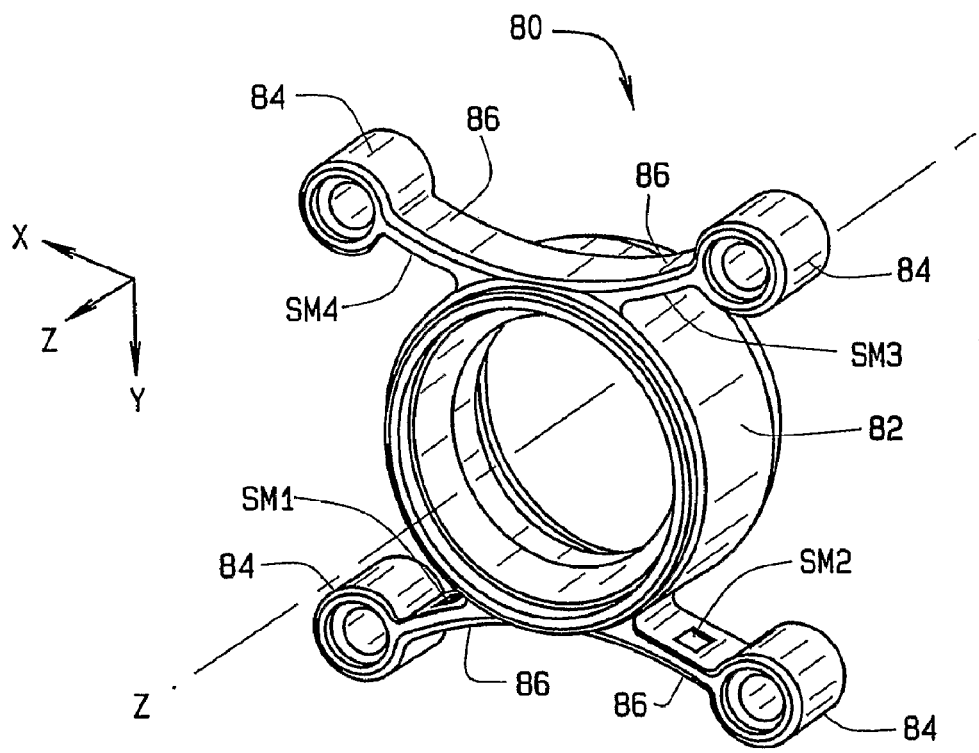
FIG. 6 is a perspective view from the outboard end of another modified housing for the wheel end.

Another modified housing 80 (FIG. 6) is similar to the housing 2. It also has a core 82 provided with outer raceways 50. Moreover, it has four ring mounts 84 located preferably at 90° intervals around it, each offset 45° from the vertical axis Y. However, each ring mount 84 is connected to the core 82 through a single web 86. The core 82, ring mounts 84 and webs 86 are formed integral as a unitary casting or forging. Each web 86 has a sensor module attached to it.

The relationships that exist for the housing 2 apply to the housing 82.

Figure 7:
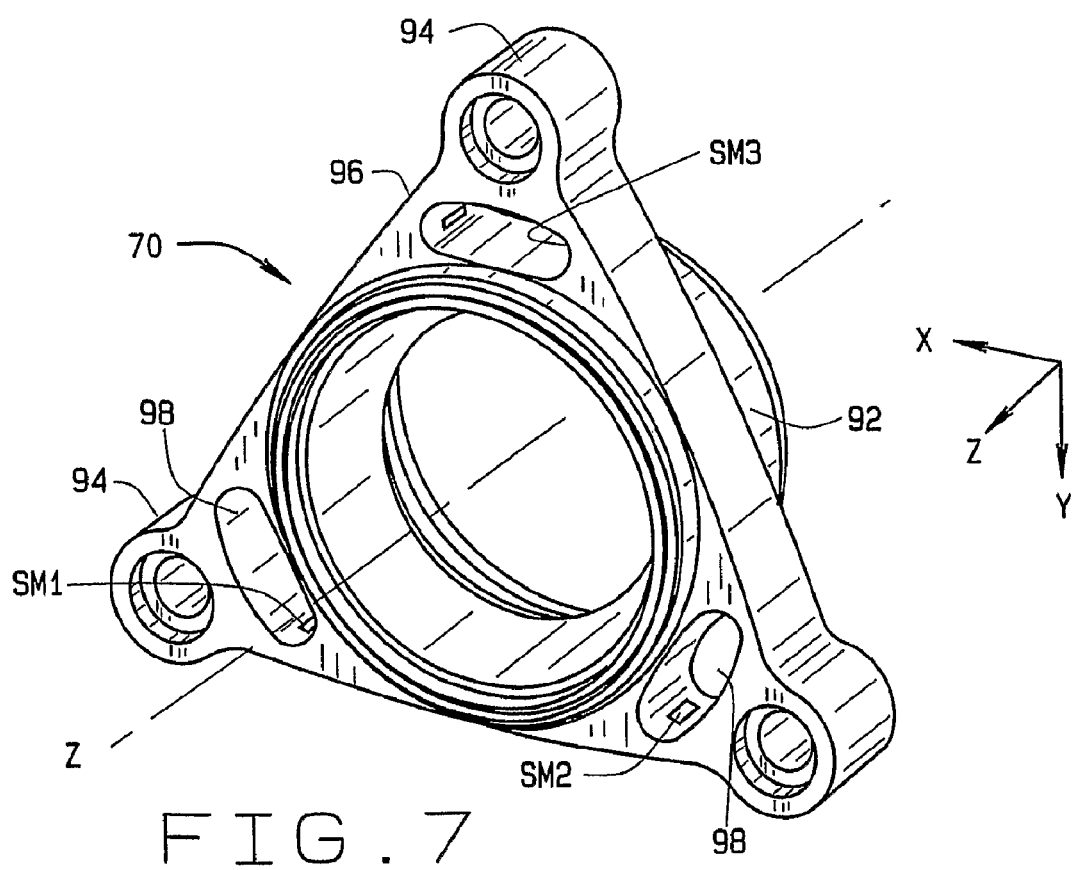
FIG. 7 is a perspective view from the outboard end of still another modified housing for the wheel end.

Still another modified housing 90 (FIG. 7) is similar to the housing 70 in that it is attached to the suspension system component C at three locations. It has a cylindrical core 92, three ring mounts 94, and web 96 that extend between and connect the ring mounts 94 to the core 92. The ring mounts 94 are located at 120° intervals around the core 92, and each is connected to the core 92 through a pair of webs 96, but in contrast to the webs 76, the web 96 vary in thickness. Indeed, each together with its ring mount 94 and the core 92 forms an elongated aperture 98 that has arcuate ends at the webs 96. This renders the web 96 progressively thicker from the ends of the aperture 98 toward both the ring mount 94 and the core 92. The sensor modules SM are mounted on at least one web 96 of each pair, preferably within the apertures 98 at their curved ends where the webs 96 are thinnest and possess their greatest flexibility.

The housing 90 is attached to the suspension system component C with one of its ring mounts 94 along the vertical axis Y and its other two ring mounts 94 offset 60° from the axis Y. The relationships that exist for the housing 72 apply to the housing 92.

The wheel end A having any one of the housing 2, 70, 80 or 90 provides following unique features:

a load sensing structure between the bearing 6 and the mounts 14, 74, 84, 94 for securement to a suspension system component a load support structure that is directionally deflectable a load support structure that is directionally rigid a load support structure that may have cavities or pockets 22 for the mounting sensor modules SM cavities or pockets 22 that can be sealed to protect the sensor modules SM from harsh environment Other types of antifriction bearings may be substituted for the bearing 6. For example, angular contact ball bearings or spherical roller bearings that also have raceways inclined with respect to the axis Z will suffice. The sensor modules SM need not be located in pockets 22, and where each ring mount is attached with two webs, they may be on either the inside faces of those webs, that is the faces along the apertures formed by the webs, or they may be on the outside faces of the webs. Furthermore, where each mount is attached with two webs, sensor modules SM may be attached to each web of a pair. This can produce two sets of signals, allowing a comparison of the forces and moments derived from the signals of the two sets, for example, as a safety check.

The invention claimed is:

1. A wheel end for coupling a road wheel to a suspension system component of an automotive vehicle so that the wheel can rotate about an axis of rotation and for further reflecting forces and moments exerted by the vehicle on the wheel end and vice versa, said wheel end comprising:

a housing including a tubular core, a plurality of mounts spaced outwardly from the core for securement to a suspension system component, and a plurality of webs extending between the core and the mounts to couple the core to the mounts, the transverse dimension of each web measured parallel to the axis being substantially greater than the dimension of the cross-section of each web measured in a radial direction with respect to the axis, so that the webs have extended axially directed surfaces and are wider than they are thick;

a hub having a flange configured for securement of the road wheel to it and a spindle that projects from the flange into the tubular core of the housing;

an antifriction bearing located between the tubular core of the housing and the spindle of the hub, the bearing being configured to transfer radial loads between the housing and hub and thrust loads in both axial directions as well;

wherein said plurity of webs are configured to accomodates radial deflections between said housing and said plurality of mounts in response to said transferred loads, and to retard axial deflections between said housing and said plurality of mounts in response to said transferred loads; and further including a plurality of sensors attached to the axially directed surfaces of at least some of the webs, radially outwardly from the tubular core, to detect deflections in the webs.

2. A wheel end according to claim 1 wherein the sensors measure strains in the longitudinal and transverse directions in the webs.

3. A wheel end according to claim 2 wherein the sensors also measure shear strains in the webs.

4. A wheel end according to claim 1 wherein at least one of the webs has a pocket, disposed in an axially aligned surface, and at least one of the sensors is located within the pocket.

5. A wheel end according to claim 1 wherein the webs are formed integral with the core and with the mounts.

6. A wheel end according to claim 1 wherein the mounts alone form the radially outermost portions of the housing.

7. A wheel end according to claim 1 wherein each mount is connected to two webs, and the webs for each mount converge from the core to the mount in a spaced apart configuration to accommodate said radial deflections between said housing and the mount.

8. A wheel end according to claim 1 wherein the mounts are four in number.

9. A wheel end according to claim 8 wherein the sensors reflect the magnitude of the following forces and moments according to the following formulas:

$$Fx = f1[(S1a - S1b + S4a - S4b) - (S2a - S2b + S3a - S3b)]$$

$$Fy = f2[(S1a - S1b + S2a - S2b) - (S3a - S3b + S4a - S4b)]$$

$$Fz = f3(S1ab + S2ab + S3ab + S4ab)$$

$$Mx = f4(S1ab + S2ab - S3ab - S4ab)$$

$$My = f5(S1ab + S4ab - S2ab - S3ab)$$

where S1, S2, S3 and S4 represent the signals produced by strain sensors SM1, SM2, SM3 and SM4, respectively, disposed on the transverse surfaces of the webs that are connected to the four mounts, where the subscript a represents the longitudinal direction along the web to which it applies and the subscript b represents the transverse direction, and the subscript ab represents shear strain;

where x, y and z represent coordinates of a three-axis coordinate system in which the x axis is vertical, the y axis is horizontal and the z axis is horizontal and coincides with the axis of the bearing assembly;

F represents a force along the axis identified by its subscript;

M represents a moment about the axis identified by its subscript; and f represents a simple function.

10. A wheel end according to claim 1 wherein the mounts are three in number.

11. A wheel end according to claim 10 wherein the sensors reflect the magnitude of the following forces and moments according to the following formulas:

$$Fx = f1[S1a - S1b - (S2a - S2b + S3a - S3b)]$$

$$Fy = f2[S2a - S2b - (S3a - S3b)]$$

$$Fz = f3(S1ab + S2ab + S3ab)$$

$$Mx = f4(S2ab - S3ab)$$

$$My = f5(S1ab - S2ab - S3ab)$$

where S1, S2, and S3 represent the signals produced by strain sensors SM1, SM2, and SM3 respectively, disposed on the transverse surfaces of the webs that are connected to the three mounts;

where the subscript a represents the longitudinal direction along the web to which it applies, the subscript b represents the transverse, and the subscript ab represents shear strain;

where x, y and z represent coordinates of a three-axis coordinate system in which the x axis is horizontal, the y axis is vertical and the z axis is horizontal and coincides with the axis of the bearing assembly;

F represents a force along the axis identified by its subscript;

M represents a moment about the axis identified by its subscript; and f represents a simple function.

12. A wheel end according to claim 1 wherein the mounts are arranged at equal circumferential intervals around the core.

13. A wheel end according to claim 12 wherein inner raceways carried by the spindle and presented outwardly away from the axis, outer raceways presented inwardly toward the inner raceways, and rolling elements are arranged in two rows between the inner and outer raceways, with the rolling elements of one row being oriented to transfer axial forces in one axial direction and the rolling elements of the other row being oriented to transfer axial forces in the other axial direction.

14. A wheel end according to claim 1 in combination with a suspension system component and a road wheel; and wherein the housing of the wheel end is attached to the suspension system component at the mounts on the housing and the road wheel is attached to the flange of the hub.

15. A process for ascertaining loads transferred through the wheel end of claim 8, said process comprising applying the following formulas to determine such loads:

$$Fx = f1[(S1a - S1b + S4a - S4b) - (S2a - S2b + S3a - S3b)]$$

$$Fy = f2[(S1a - S1b + S2a - S2b) - (S3a - S3b + S4a - S4b)]$$

$$Fz = f3(S1ab + S2ab + S3ab + S4ab)$$

$$Mx = f4(S1ab + S2ab - S3ab - S4ab)$$

$$My = f5(S1ab + S4ab - S2ab - S3ab)$$

where S1, S2, S3 and S4 represent the signals produced by strain sensors SM1, SM2, SM3 and SM4, respectively, disposed on the transverse surfaces of the webs that are connected to the four mounts, where the subscript a represents the longitudinal direction along the web to which it applies and the subscript b represents the transverse direction, and the subscript ab represents shear strain;

where x, y and z represent coordinates of a three-axis coordinate system in which the x axis is vertical, the y axis is horizontal and the z axis is horizontal and coincides with the axis of the bearing assembly;

F represents a force along the axis identified by its subscript;

M represents a moment about the axis identified by its subscript; and f represents a simple function.

16. A process for ascertaining loads transferred through the wheel end of claim 10, said process comprising applying the following formulas to determine such loads:

$$Fx = f1[S1a - S1b - (S2a - S2b + S3a - S3b)]$$

$$Fy = f2[S2a - S2b - (S3a - S3b)]$$

$$Fz = f3(S1ab + S2ab + S3ab)$$

$$Mx = f4(S2ab - S3ab)$$

$$My = f5(S1ab - S2ab - S3ab)$$

where S1, S2, and S3 represent the signals produced by strain sensors SM1, SM2, and SM3 respectively, disposed on the transverse surface of the webs that are connected to the three mounts;

where the subscript a represents the longitudinal direction along the web to which it applies, the subscript b represents the transverse, and the subscript ab represents shear strain;

where x, y and z represent coordinates of a three-axis coordinate system in which the x axis is horizontal, the y axis is vertical and the z axis is horizontal and coincides with the axis of the bearing assembly;

F represents a force along the axis identified by its subscript;

M represents a moment about the axis identified by its subscript; and f represents a simple function.

\* \* \* \* \*